United States Patent [19]

Kato et al.

[11] Patent Number: 5,086,488
[45] Date of Patent: Feb. 4, 1992

[54] TRANSFORM CODING APPARATUS

[75] Inventors: Yoshiaki Kato; Tokumichi Murakami, both of Kanagawa, Japan

[73] Assignee: Mitsubishi Denki Kabushiki Kaisha, Tokyo, Japan

[21] Appl. No.: 564,824

[22] Filed: Aug. 9, 1990

[30] Foreign Application Priority Data

Aug. 19, 1989 [JP] Japan .................................. 1-213622
Dec. 13, 1989 [JP] Japan .................................. 1-324527
Jan. 19, 1990 [JP] Japan .................................. 2-11500
Feb. 15, 1990 [JP] Japan .................................. 2-34658

[51] Int. Cl.$^5$ .............................................. G06K 9/00
[52] U.S. Cl. .......................................... 382/56; 382/51; 358/261.1
[58] Field of Search .................... 382/56, 48, 21, 51; 358/138, 135, 261.1, 426

[56] References Cited

U.S. PATENT DOCUMENTS

| 4,740,994 | 4/1988 | Ouchi | 358/261.1 |
| 4,908,862 | 3/1990 | Kaneko et al. | 358/261.1 |
| 4,922,273 | 5/1990 | Yonekawa et al. | 382/56 |

Primary Examiner—David K. Moore
Assistant Examiner—Yon Jung
Attorney, Agent, or Firm—Rothwell, Figg, Ernst & Kurz

[57] ABSTRACT

This invention relates to a transform coding apparatus where linear transform is performed for input signal series such as image signals, and transform coefficients are quantized from lower frequency components to higher frequency components in the transform region, and then the quantized transform coefficients aare coded and outputted. The quantized transform coefficients being zero are counted, and when the count value exceeds the prescribed threshold value, the quantization is terminated so that high speed in the coding is intended and variation of the code generation rate can be prevented.

10 Claims, 12 Drawing Sheets

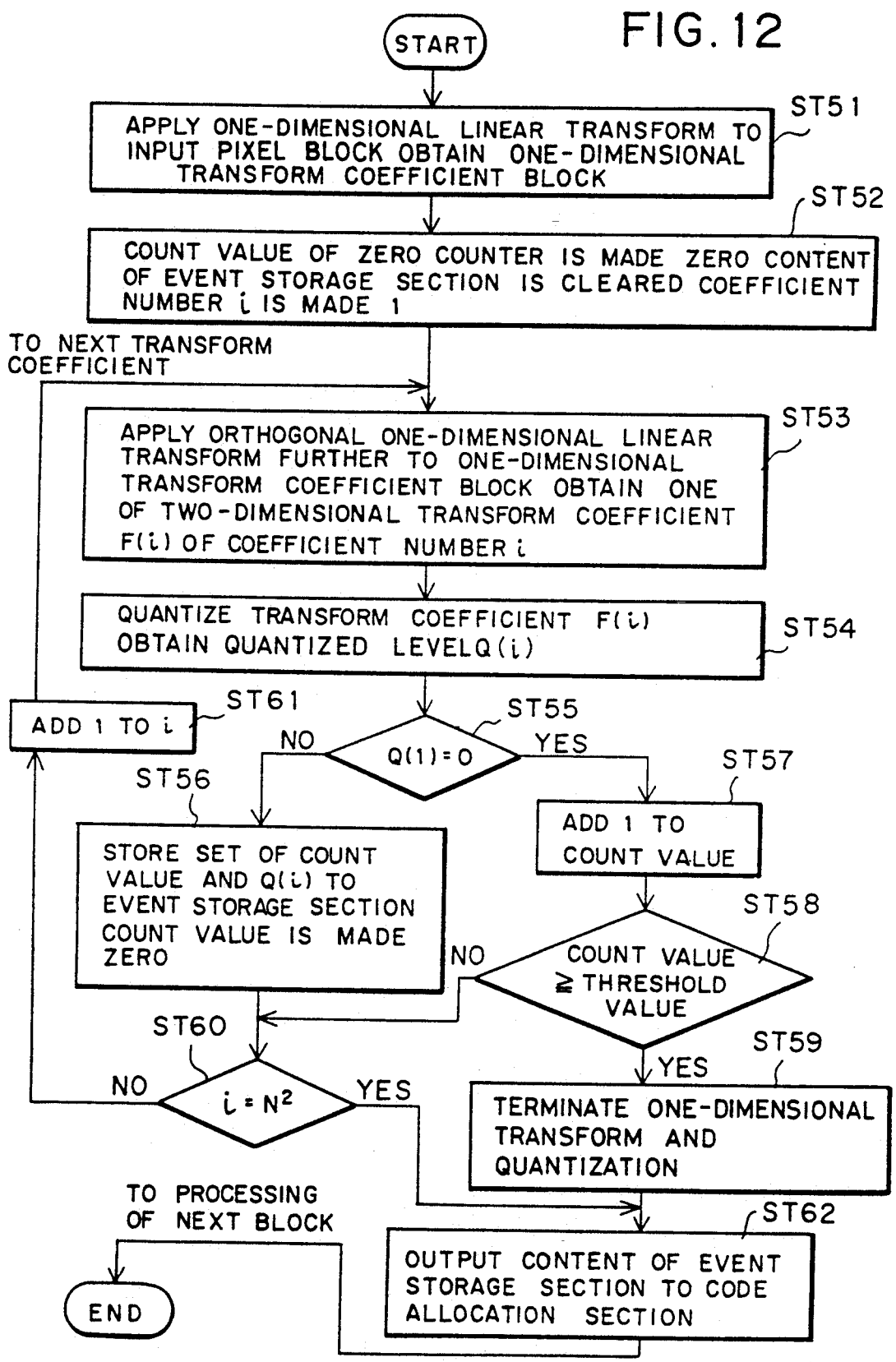

TRANSFORM CODING APPARATUS

BACKGROUND OF THE INVENTION

1. Field of the Invention

The present invention relates to a transform coding apparatus for performing band compression of image data using a linear transform coding system.

2. Description of the Prior Art

FIG. 1 is a block diagram illustrating a transform coding apparatus in the prior art disclosed, for example, in W. H. CHEN, W. K. PRATT, "Scene Adaptive Coder", (IEEE Transactions on communications, vol. COM-32, No. 3, March 1984). In FIG. 1, numeral 1 designates a blocking section for blocking input signals, numeral 2 designates a linear transform section for performing two-dimensional linear transform of the block signals, numeral 3 designates a scan transform section for rearranging signal series within the block, numeral 4 designates a quantization section, numeral 5 designates a coding section, numeral 6 designates a transmission buffer, and numeral 7 designates a coding control section.

Next, operation will be described. The blocking section 1 receives digitized input image signals 101 frame by frame, and divides the signals into two-dimensional blocks which have n pixels in the horizontal and vertical directions (n is a natural number, for example, n=4, 8, 16). The linear transform section 2 applies a two-dimensional linear transform (for example, orthogonal transform such as discrete cosine transform) to the blocked image signals 102, and produces transform coefficient blocks 103 in the space frequency region. In this case, the two-dimensional discrete cosine transform, for example, of $8 \times 8$ pixel blocks $f(x, y)$ $(x, y=0, 1, \ldots, 7)$ can be given by following formula.

$$F(u, v) = \frac{1}{4} C(u) C(v) \sum_{x=0}^{7} \sum_{y=0}^{7} f(x, y) \times \cos\left[\frac{\pi u(2x+1)}{16}\right] \cos\left[\frac{\pi v(2y+1)}{16}\right]$$

for $u, v = 0, 1, \ldots, 7$, where $$C(u), C(v) = \begin{cases} \frac{1}{\sqrt{2}} & \text{(for } u, v = 0) \\ 1 & \text{(for } u, v = 1, 2, \ldots, 7) \end{cases}$$

where x, y are coordinates in the pixel region and u, v are coordinates in the transform region.

Properties of the transform coefficient blocks $F(u, v)$ will be described based on FIG. 2. Values of $F(u, v)$ indicate the degree of the respective space frequency components included in the blocked image signals 102. The frequency in the horizontal direction becomes high as the value of u becomes large, and the frequency in the vertical direction becomes high as the value of v becomes large. That is, the value of $F(0, 0)$ corresponds to the intensity of the DC component of the blocked image signal 102, and the value of $F(7, 7)$ corresponds to the intensity of the AC component having high frequencies in both the horizontal and vertical directions. Consequently, for a stationary image block such as the background where variation of values of pixels is little, significant coefficients of non-zero appear only at lower frequency components and zero coefficients appear at most of higher frequency components. On the contrary, for an image block of the edge portion or the like where variation of values of pixels is high, significant coefficients of non-zero appear not only at lower frequency components but also at higher frequency components.

Next, the scan transform section 3 rearranges the transfer coefficients within the transfer coefficient block 103, for example, in the order of arrow shown in FIG. 2, and outputs transform coefficient series 104. In the foregoing $8 \times 8$ pixel block, the coefficient series of consecutive 64 coefficients is outputted for one block. The rearrangement is performed by zigzag scanning from transform coefficients of lower frequency components where significant coefficients are likely to occur to transform coefficients of higher frequency components where significant coefficients are less likely to occur, so that the significant coefficients continue at front half and the zero coefficients continue at rear half as much as possible. Next, the quantization section 4 quantizes the transform coefficient series 104 in given quantization step size 109, and outputs quantized level series $Q(u, v)$ 105. The coding section 5 allocates codes to the quantized level series 105, and outputs coded data 106 to the transmission buffer 6.

The two-dimensional variable length coding will now be described as an example of a code allocating method. This is performed such that the number of consecutive zero quantized levels (hereinafter referred to as "run") and the non-zero quantized levels are combined for the quantized level series 105, and one Huffman code is allocated for the combined event (run level). For example, in the case of the quantized level series shown in FIG. 3, the event (run level) becomes as follows.

(0, 20), (2, 15), (4, 5), (3, 2), (7, 1), EOB; where EOB is a mark indicating that non-zero quantized level does not exist and a zero quantized level continues until the end of the block. Consequently, in the case of the quantized level series, the predetermined Huffman codes are allocated respectively to the six events including the EOB.

Next, the transmission buffer 6 smoothes the varying the amount of the coded bits and transmits the code 107 at constant rate to the transmission line. The coding control section 7 performs feedback control of quantization step size 109 adaptively, with buffer occupancy signal 108 being the quantity of residual data in the transmission buffer 6, and outputs it to the quantization section 4. That is, when the buffer occupancy signal 108 is large, in order to decrease the amount of the coded bits, the quantization step size 109 is made large and the input image is quantized coarsely. On the contrary, when the buffer occupancy 108 is small, in order to increase the amount of the coded bits, the quantization step size 109 is made small and the input image is quantized finely. Since the number of non-zero quantized levels is significantly different depending on whether the quantization step size 109 is large or small, the amount of the coded bits varies significantly from several tens to several thousands of bits.

FIG. 4 is a block diagram showing another transform coding apparatus in the prior art. In FIG. 4, numeral 10 designates a decision section allowing only the transform coefficients within the prescribed transmission range to pass, numeral 11 designates a comparison section for comparing the transform coefficients with the threshold value, numeral 12 designates a transmission range determining section for determining the transmission range of the transform coefficients, numeral 13 designates a threshold setting section for setting the threshold value, and numeral 14 designates a control section for determining the quantization characteristics and the threshold value.

Next, operation will be described. The blocking section 1 receives digitized input image signals 101 frame by frame, and divides the signals into two-dimensional blocks which have n pixels in the horizontal and vertical directions (n is a natural number, for example, n=4, 8, 16). The linear transform section 2 applies a two-dimensional linear transform (for example, an orthogonal transform such as discrete cosine transform) to the blocked image signals 102, and produces transform coefficient blocks 103 in the space frequency region.

Next, the comparison section 11 compares the transform coefficient block 103 with the threshold value 113 given from the threshold setting section 13, and outputs the decision results 112. The transmission range determining section 12 totalizes the decision results 112 which are complete for each block and determines which coefficients will be transmitted and outputs the transmission range 114. That is, the transmission range determining section 12 totalizes the decision results 112 which is complete in 64 pieces obtained for the 64 coefficients in the 8×8 blocks. As a result, if the decision results indicate that many transform coefficients of block 103 are less than the threshold value 111, only lower frequency components may be transmitted and therefore the transmission range 114 is small. On the contrary, if the decision results indicate that many transform coefficients of block 103 are more than the threshold value 111, not only lower frequency components but also higher frequency components must be transmitted and therefore the transmission range 114 becomes large. The scan transform section 3 rearranges the transform coefficients within the transform coefficient block 103, for example, in the order to arrow shown in FIG. 2, and outputs a transform coefficient series 104. The rearrangement is performed by zigzag scanning from transform coefficients of lower frequency components where significant coefficients are likely to occur to transform coefficients of higher frequency components where significant coefficients are less likely to occur, so that the significant coefficient series continues as long as possible. Next the decision section 10 outputs only the transform coefficients 110 of the transform coefficient series 104 within the given transmission range 114. The quantization section 4 quantizes the transform coefficients 110 in the given quantization characteristics 115, and outputs quantized levels 105. The coding section 5 allocates codes based on the quantization characteristics 115 used in the quantization section 4, the quantized levels 105 and the transmission range 114, and transmits the codes 106 to the transmission line or the like. Also the control section 14 controls the quantization characteristics 115 and the threshold value 113 adaptively by the amount of the coded bits of the input image. That is, when the input image is quantized coarsely and the amount of the coded bits is decreased, both the quantization characteristics 115 and the threshold value 113 are outputted in large values. On the contrary, when the input image is quantized finely and the amount of the coded bits is increased, both the quantization characteristics 115 and the threshold value 113 are outputted in small values.

The transform coding apparatus in the prior art shown in FIG. 1 has problems in that the quantization must be performed for any coefficient, and the amount of the coded bits varies significantly depending on whether the quantization step size is large or small and therefore the control of the coding is difficult.

Also the transform coding apparatus in the prior art shown in FIG. 4 has problems in that although the non-zero transform coefficients to be coded and transmitted are limited, all transform coefficients must be obtained in order to estimate the coefficient transmission range, and therefore the processing time required for the linear transform cannot be reduced.

SUMMARY OF THE INVENTION

In order to solve the above-mentioned problems in the prior art, an object of the present invention is to provide a transform coding apparatus wherein the coefficient transmission range is determined corresponding to the quantized level series within the transform block, and the processing time required for the linear transform and the quantization is reduced and the variation of the amount of the coded bits is decreased.

In a transform coding apparatus according to the invention, a linear transform is performed for the input signal series, and the transform coefficients are quantized and coded in sequence from that of lower frequency components to that of higher frequency components in the transform region.

And then in the transform coding apparatus according to the invention, the linear transform and the quantization are performed in combination in the given order for the input signal block, and the number of the consecutive zero quantized level is counted and if the count value exceeds the given threshold value the linear transform is not performed and any residual quantization output is made zero. That is, based on the number of the consecutive zero quantized levels, a decision is made whether a next transform coefficient is to be estimated by the linear transform or not. If the decision is that the transform coefficient is not to be estimated, the value of the quantization output is made zero.

Also the transform coding apparatus of the invention may be constituted as follows. That is, the transform coding apparatus is provided with means for counting the number of the consecutive zero quantized levels among values of the quantized transform coefficients, means for determining the threshold value of the number of the consecutive zero quantized levels to be transmitted based on the buffer occupancy of the transmission buffer, and means for setting the quantized levels of the subsequent transform coefficients to zero if the count value of the zero quantized levels exceeds the determined threshold value. In the transform coding apparatus in such constitution, the linear transform is performed for the input signal blocks and the quantization is performed in the given order, and the number of the consecutive zero quantized levels is counted and if the count value exceeds the threshold value determined from the buffer occupancy of the transmission buffer the value of the subsequent quantized level is made zero.

Also the transform coding apparatus of the invention may be constituted as follows. That is, the transform coding apparatus is provided with means for counting the number of consecutive zero quantized levels among values of the quantized transform coefficients, means for storing a set of the number of the non-zero quantized levels among the quantized coefficients and the number of the consecutive zero quantized levels counted by the counting means before the non-zero quantized levels appear, means for setting the threshold value of the number of the consecutive zero quantized levels to be coded and transmitted from the buffer occupancy of the transmission buffer in order that the amount of the coded bit is close to the prescribed transmission information quantity, and means for stopping the quantization of the coefficients by subsequent linear transform if the count value of the consecutive zero quantized levels exceeds the threshold value and for allocating codes to the storage content of the storing means. In the transform coding apparatus in such constitution, the linear transform is performed for the input signal block and the quantization is performed in the given order, and the number of the consecutive zero quantized levels is counted and the set of the non-zero quantized levels and the number of the consecutive zero quantized levels counted before the non-zero quantized levels appear is temporarily stored as an event, and if the number of the consecutive zero quantized levels exceeds the threshold value set from the buffer occupancy of the transmission buffer, the quantization of the transform coefficients is terminated and codes are allocated to the stored event.

Further the transform coding apparatus of the invention may be constituted as follows. That is, the transform coding apparatus is provided with means for applying a one-dimensional linear transform to the blocked input signal series and obtaining one-dimensional transform coefficients, means for applying an orthogonal one-dimensional linear transform further to the previous one-dimensional transform coefficients from that of lower frequency components to that of higher frequency components and obtaining a two-dimensional transform coefficient, means for counting the number of the consecutive zero quantized levels among the quantized two-dimensional transform coefficients, means for storing a set of the number of the non-zero quantized levels among the quantized two-dimensional transform coefficients and the number of the consecutive zero quantized levels counted by the counting means before the non-zero quantized levels appear, means for setting the threshold value of the number of the consecutive zero quantized levels to be coded and transmitted from the buffer occupancy of the transmission buffer in order that the amount of the coded bits is close to the prescribed transmission information quantity, and means for terminating the one-dimensional linear transform and the quantization processing to estimate the subsequent two-dimensional transform coefficients if the count value of the consecutive zero quantized levels exceeds the threshold value and for allocating codes to the storage content of the storing means. In the transform coding apparatus in such constitution, the one-dimensional linear transform is performed for the input signal blocks and further the orthogonal one-dimensional linear transform is applied and thereby a two-dimensional transform coefficient is obtained and the quantization is performed, and the number of the consecutive zero quantized levels is counted and a set of the value of the non-zero quantized levels and the number of the consecutive zero quantized levels counted is temporarily stored as an event, and if the number of the consecutive zero quantized levels exceeds the threshold value set from the buffer occupancy of the transmission buffer, the one-dimensional linear transform and the quantization to estimate the subsequent two-dimensional transform coefficients are terminated and codes are allocated to the stored event.

BRIEF DESCRIPTION OF THE DRAWINGS

FIG. 12 is a flow chart illustrating operation of the transform coding apparatus shown in FIG. 11.

DETAILED DESCRIPTION OF THE PREFERRED EMBODIMENTS

Figure 4:
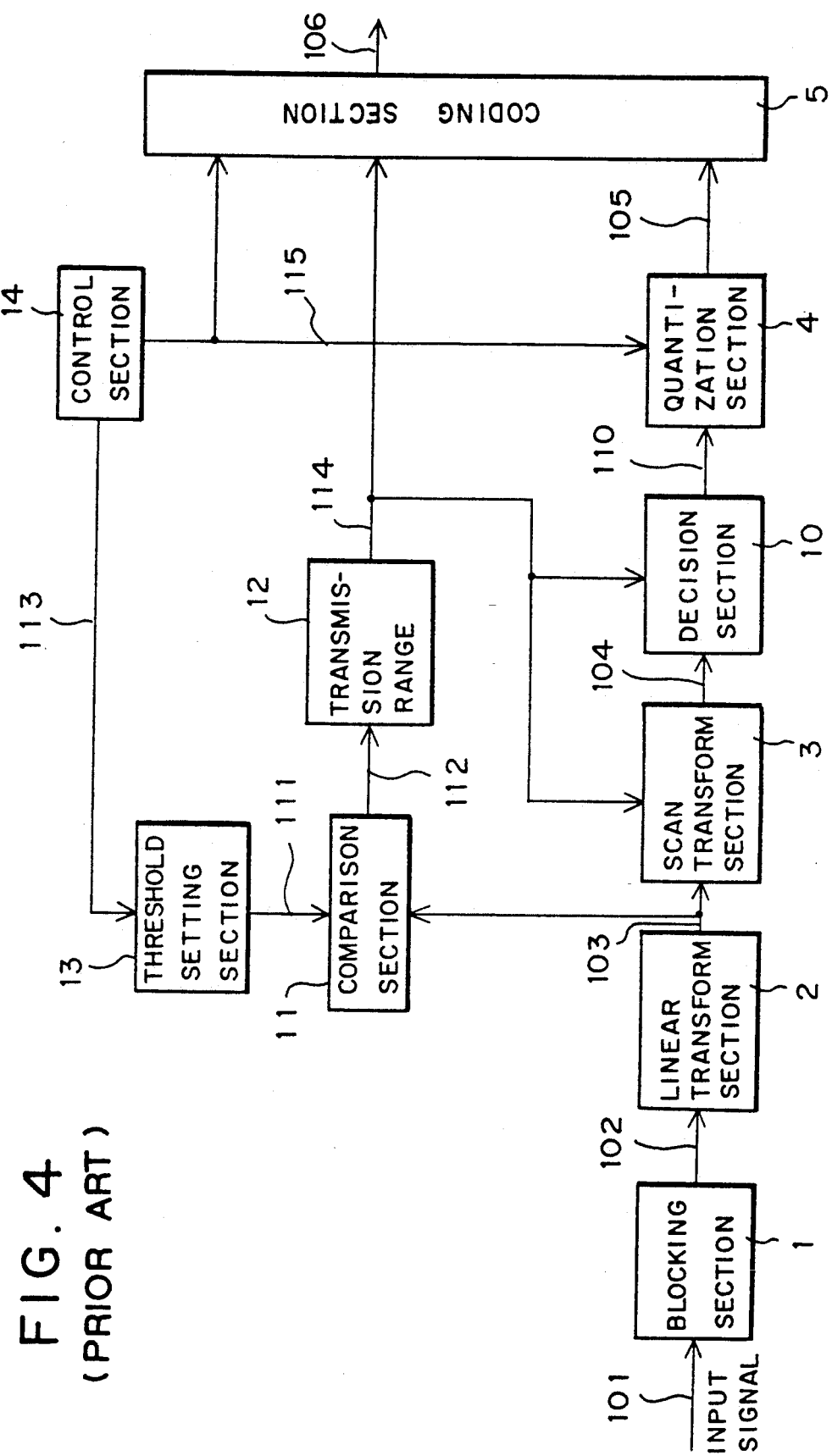
FIG. 4 is a block diagram showing another transform coding apparatus in the prior art.
Figure 5:
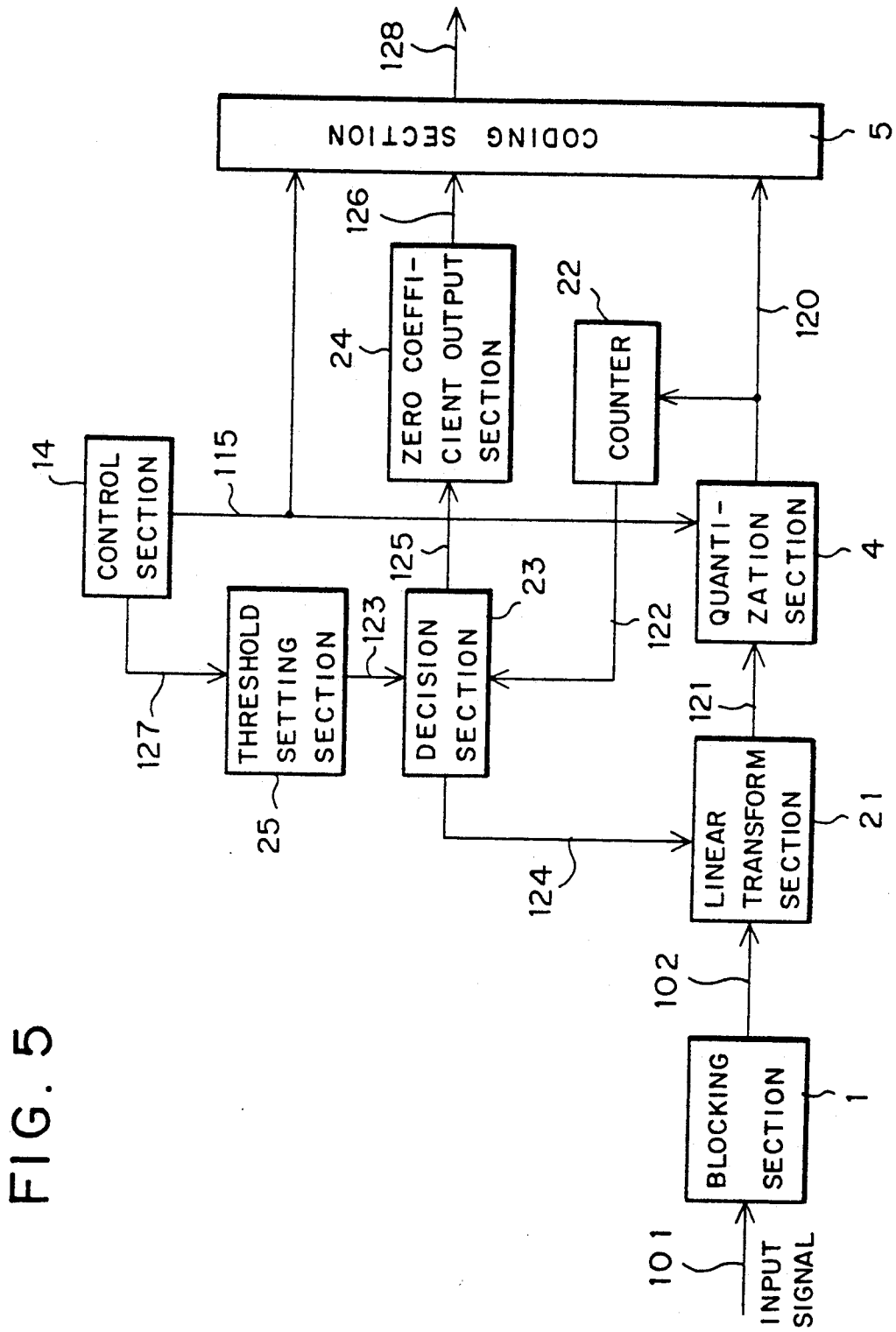
FIG. 5 is a block diagram showing a transform coding apparatus as a first embodiment of the invention.
Figure 6:
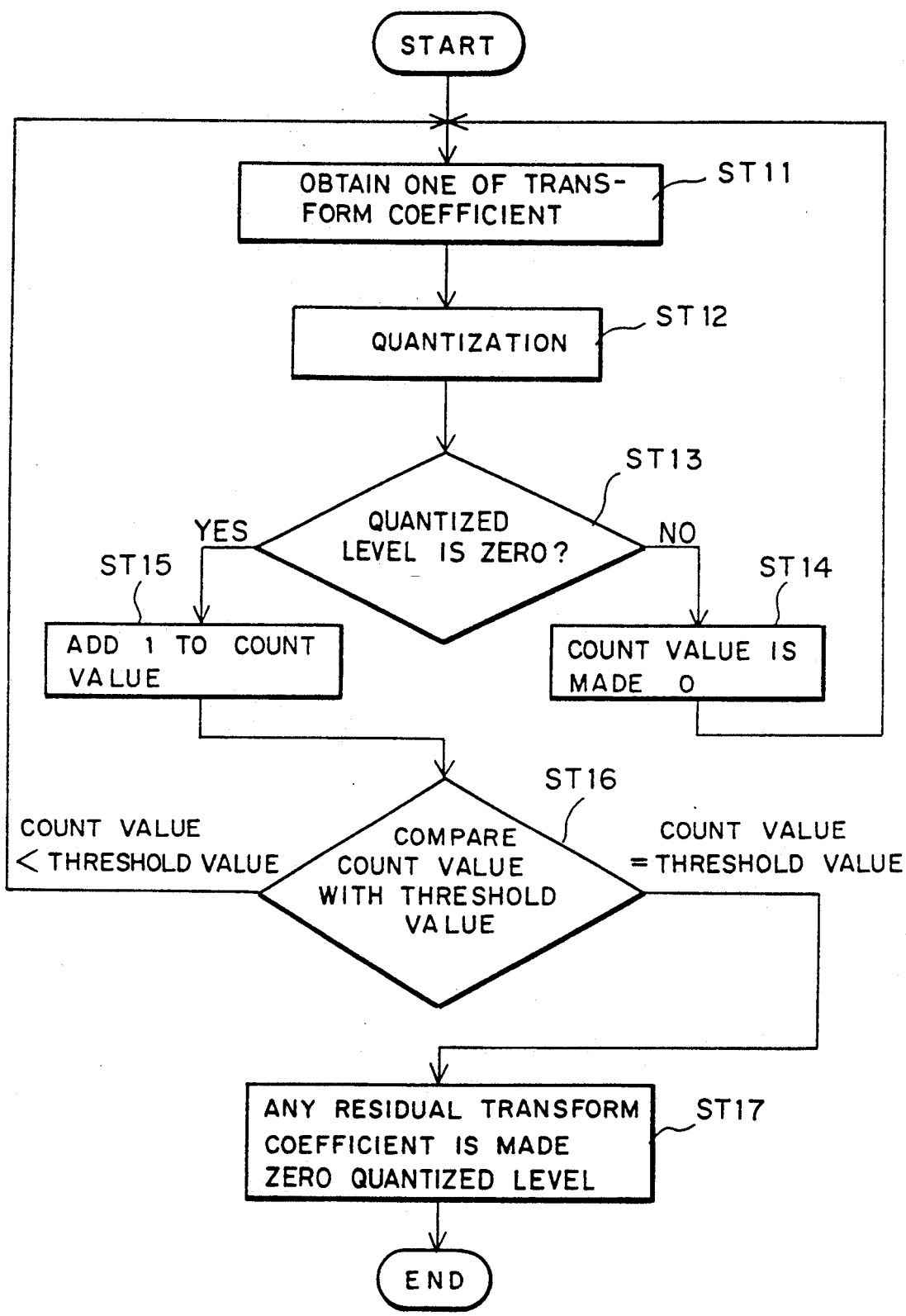
FIG. 6 is a flow chart illustrating operation of the transform coding apparatus shown in FIG. 5.

A first embodiment of the invention will now be described based on FIG. 5 and FIG. 6. In FIG. 5, numeral 21 designates a linear transform section for performing a linear transform of blocked signals in the predetermined order, numeral 22 designates a counter for counting the number of the consecutive zero quantized levels, numeral 23 designates a decision section for comparing the count value with the threshold value and reaching a decision whether the linear transform of next coefficient should be performed or not, numeral 24 designates a zero coefficient output section for outputting the zero quantized levels of the given number, and numeral 25 designates a threshold setting section for setting the threshold value. Constitution of the embodiment is similar to that shown in FIG. 4 except that as above described.

Next, operation will be described with reference to FIGS. 5 and 6. In a similar manner to the apparatus shown in FIG. 4, digitized input image signals 101 are divided frame by frame into two-dimensional blocks by the blocking section 1, and become blocked image signals 102. The linear transform section 2 applies the linear transform to the blocked image signals 102 in the order shown by arrow in FIG. 2 for example, and outputs a transform coefficient 121 (step ST11). The quantization section 4 quantizes the transform coefficients 121 in given quantization characteristics 115, and outputs quantization coefficients 120 (step ST12). The counter 22 counts the number of the consecutive quantized levels 120 having value zero (steps ST13, ST15). If a non-zero quantized level 120 is outputted from the quantization section 4, the count value 122 is reset and becomes zero (step ST14). The decision section 23 compares the inputted count value 122 with the threshold value 123 given from the threshold setting section, and process is branched to the following processing (step ST16).

(I) If count value < threshold value, the decision section 23 outputs the decision result 124 indicating that next coefficient is to be estimated by the linear transform to the linear transform section 21. Then the linear transform section 21 performs the linear transform continuously.

(II) If count value = threshold value, the decision section 23 outputs the decision result 124 indicating that the linear transform is not to be performed from next coefficient to last coefficient to the linear transform section 21, and outputs the number 125 of coefficients where the linear transform is not performed. The zero coefficient output section 24 outputs the zero quantized level series 126 of the given number 125 to the coding section 5 (step ST17).

As already described, in general, since the magnitude of the transform coefficients becomes smaller from lower frequency components to higher frequency components, the quantized levels become zero consecutively with higher probability at higher frequency components. Consequently, when the quantization is performed in the order from lower frequency components to higher frequency components and the zero quantized levels are counted, at the small threshold value, since the above-mentioned condition (II) is satisfied at coefficients of relatively lower frequency components, the processing time required to estimate the transform coefficients can be significantly reduced.

The coding section 5 allocates codes based on the quantization characteristics 115 used in the quantization section 4, the quantization coefficients 120 and the zero quantization coefficient series 126, and transmits the codes 128 to the transmission line or the like. Also the control section 14 controls the quantization characteristics 115 and the threshold value 127 adaptively by the amount of the coded bits of the input image. That is, in order to decrease the amount of the coded bits of the input image, since the quantization must be effected coarsely, the quantization characteristics 115 are made large and the threshold value 127 is made small so that the transmission of higher frequency components is not performed. On the contrary, in order to increase the amount of the coded bits, since the quantization must be effected finely, the quantization characteristics 115 are made small and the threshold value 127 is made large so that the transmission of higher frequency components is performed and the picture quality of the decoded image is not deteriorated.

Although the combination of the two-dimensional linear transform and the quantization has been described in the above embodiment, similar effects can be obtained also by combination of the one-dimensional or three-dimensional linear transforms and the quantization.

Figure 7:
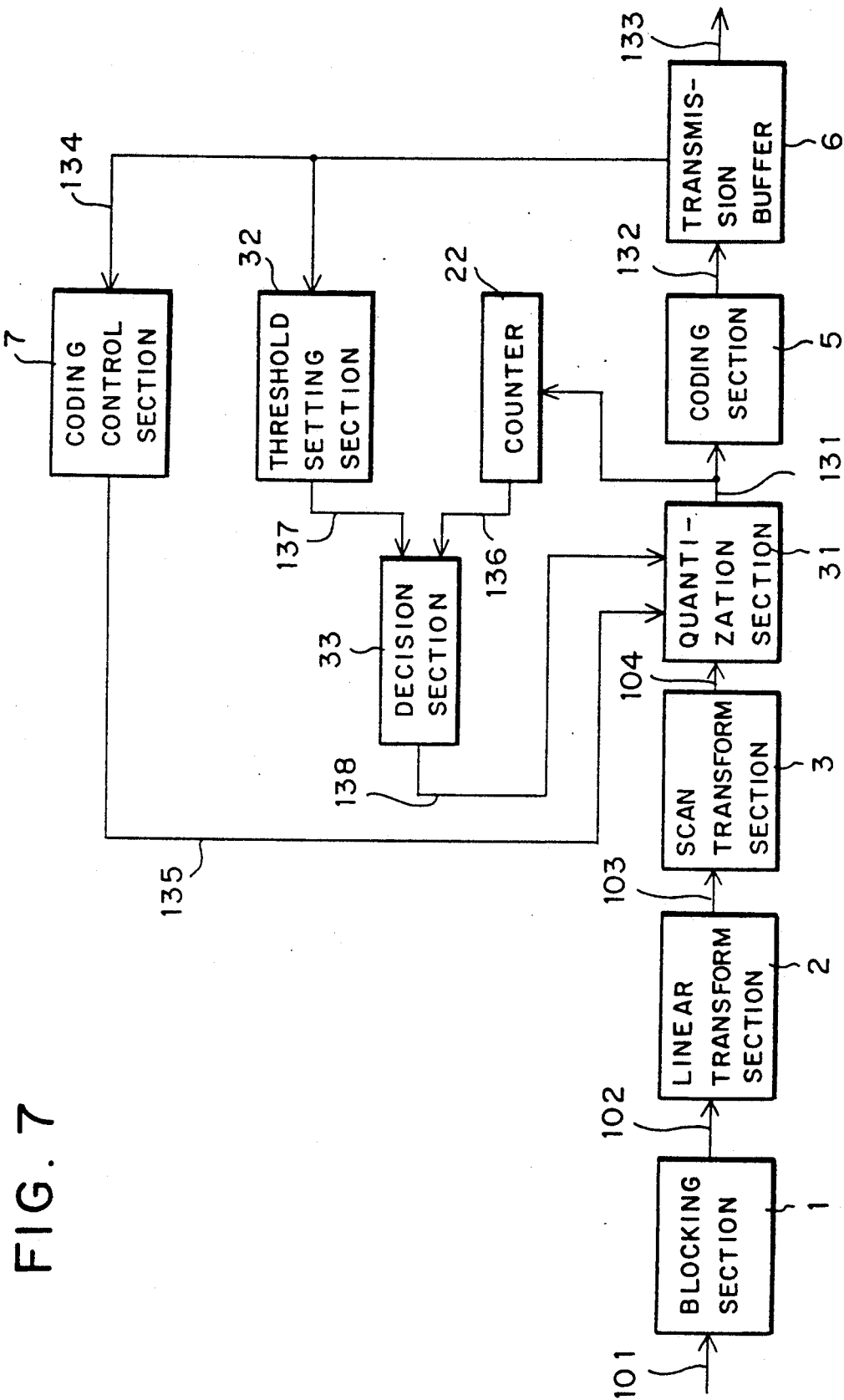
FIG. 7 is a block diagram showing a transform coding apparatus as a second embodiment of the invention.
Figure 8:
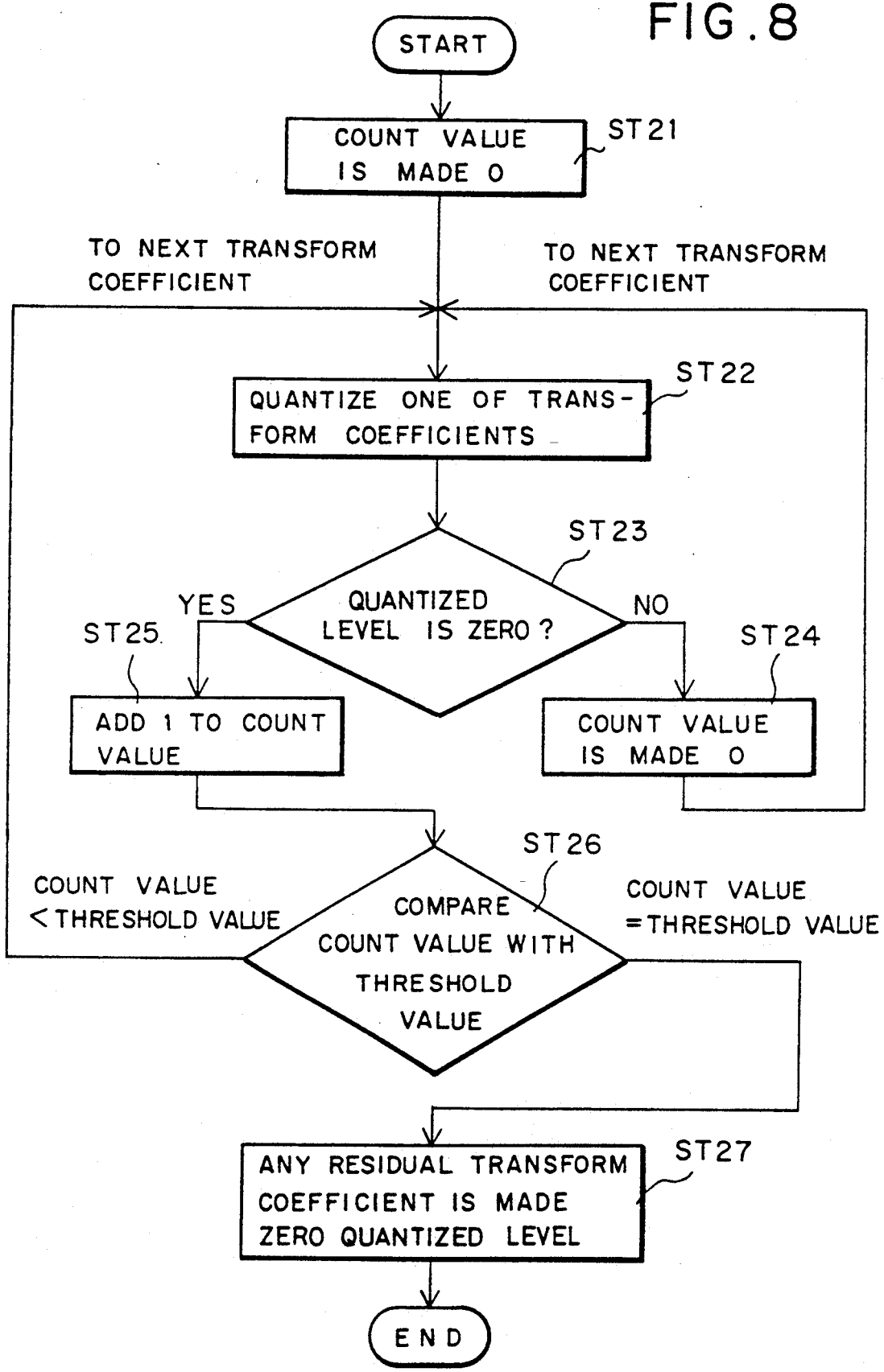
FIG. 8 is a flow chart illustrating operation of the transform coding apparatus shown in FIG. 7.

A second embodiment of the invention will be described based on FIG. 7 and FIG. 8. Numeral 31 designates a quantization section controlled by decision result 138 for performing quantization, numeral 32 designates a threshold setting section for setting the threshold value based on buffer occupancy 134, and numeral 33 designates a decision section for comparing the count value 136 of the counter 22 with the threshold value 137.

Next, operation will be described. Digitized input image signals 101 are blocked frame by frame and then subjected to linear transform. The scan transform section 3 rearranges the transform coefficients, and the quantization section 31 quantizes the transform coefficients 104 by the given quantization step size 135 and outputs the quantization coefficient series 131 (step ST22). The coding control section 7 determines the quantization step size 135 from the buffer occupancy 134 of the transmission buffer 6, and outputs it to the quantization section 31. The threshold setting section 32 determines the threshold value 137 also from the buffer occupancy 134, and outputs it to the decision section 33. The counter 22 counts the number of the consecutive zero values among the quantized level series 131, and if a non-zero quantized level is outputted from the quantization section 31, the count value 136 is reset and becomes zero (step ST24). The decision section 33 compares the inputted count value 136 with the threshold value 137 given from the threshold setting section 32, and outputs the decision result 138 to the quantization section 31. The quantization section 31 is branched to the following processing according to the decision result 138 (step ST26).

(I) If the decision result 138 indicates that count value < threshold value, the next coefficient is quantized also in the same quantization step size 135.

(II) If the decision result 138 indicates that count value = threshold value, the quantization is not performed and the zero quantized levels are outputted from next coefficient to the last coefficient.

Figure 3:
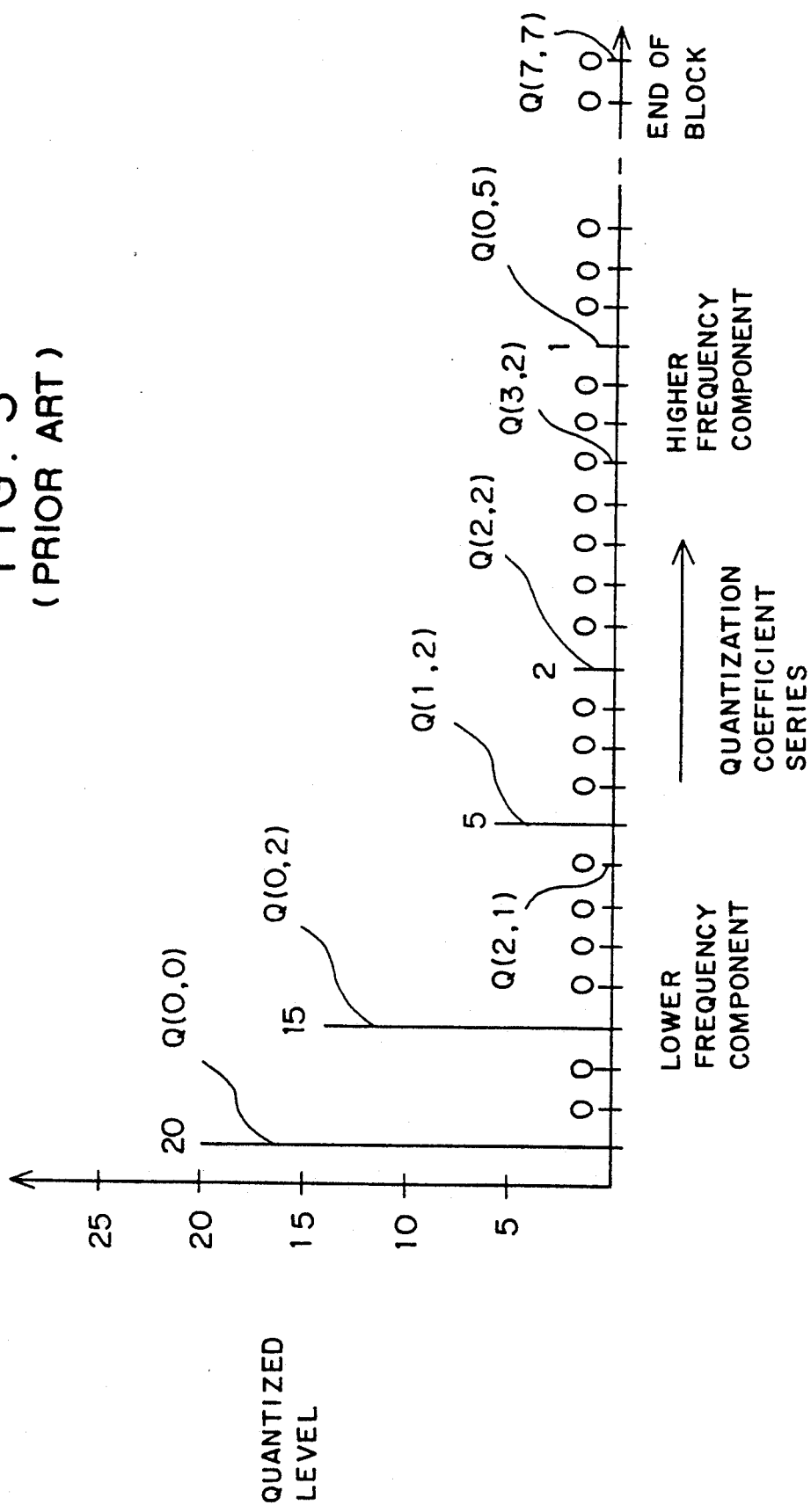
FIG. 3 is an explanation diagram illustrating allocation of codes.

In the FIG. 3, for example, when the threshold value is set to 4 or 5, the event and the number of the coefficients performing the quantization become as follows.

When the threshold value is 4, the event becomes (0, 20), (2, 15), EOB, and the number of the coefficients performing the quantization becomes eight from Q(0, 0) to Q(2, 1).

When the threshold value is 5, the event becomes (0, 20), (2, 15), (4, 5), (3, 2), EOB, and the number of the coefficients performing the quantization becomes 18 from Q(0, 0) to Q(3, 2).

Figure 1:
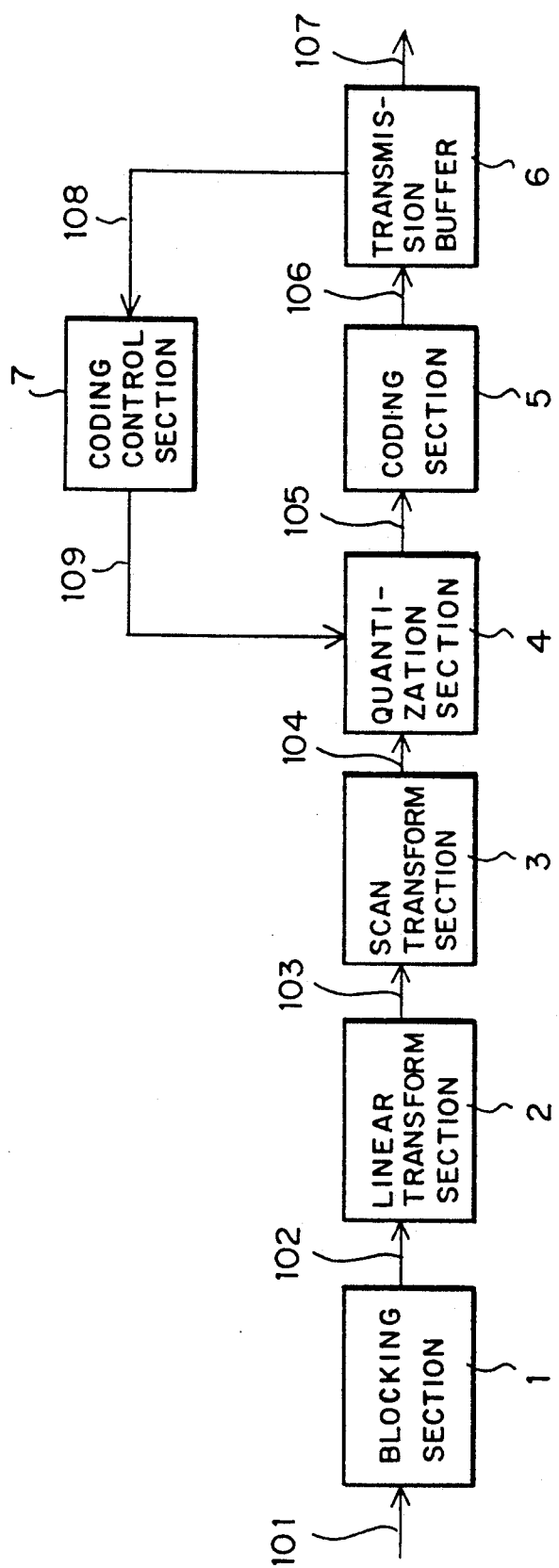
FIG. 1 is a block diagram showing a transform coding apparatus in the prior art.

As already described, in general, since the magnitude of the transform coefficients becomes smaller from lower frequency components to higher frequency components, the quantized levels Q(u, v) being a result of the quantization become zero consecutively with high probability at higher frequency components. Consequently, when the quantization is performed in the order from lower frequency components to higher frequency components and the zero quantized levels are counted, at the small threshold value (111), since the above-mentioned condition (II) is satisfied at coefficients of relatively lower frequency components, the number of the operations and the amount of the coded bits to enable the stopping of quantization and coding of the transform coefficients of higher frequency components can be reduced. Consequently, in the apparatus of the prior art shown in FIG. 1, since the amount of the coded bits is controlled only by the quantization step size 109, the amount of the coded bits varied rapidly depending on whether the quantization step size 109 is large or small. However, the threshold setting section 32 controls the threshold value 137 adaptively to that the rapid variation of the amount of the coded bits can be suppressed. That is, when the buffer occupancy 134 is low, the threshold value 137 is made small and the coefficient transmission range is limited so that the amount of the coded bits at the small quantization step size 135 can be suppressed. On the contrary, when the buffer occupancy 134 is large, the threshold value 137 is set large so that coefficients of higher frequency components can be transmitted and the deterioration of the picture quality of the decoded image can be prevented.

Also according to this embodiment, since all transform coefficients need not be necessarily quantized, when the quantization is executed using the digital signal processor or the like, the number of the operations can be significantly reduced and further advantages thus can be obtained.

Although combination of the two-dimensional linear transform and the quantization has been described in the above embodiment, similar effects can be obtained also by combination of the one-dimensional or three-dimensional linear transform and the quantization.

As above described, according to this embodiment, since decision whether the subsequent transform coefficients should be quantized and coded or not is performed depending on the number of the consecutive zero quantized levels, advantages are obtained in that the processing time and the amount of the coded bit required for the quantization can be significantly reduced without deteriorating the picture quality of the decoded image.

Figure 9:
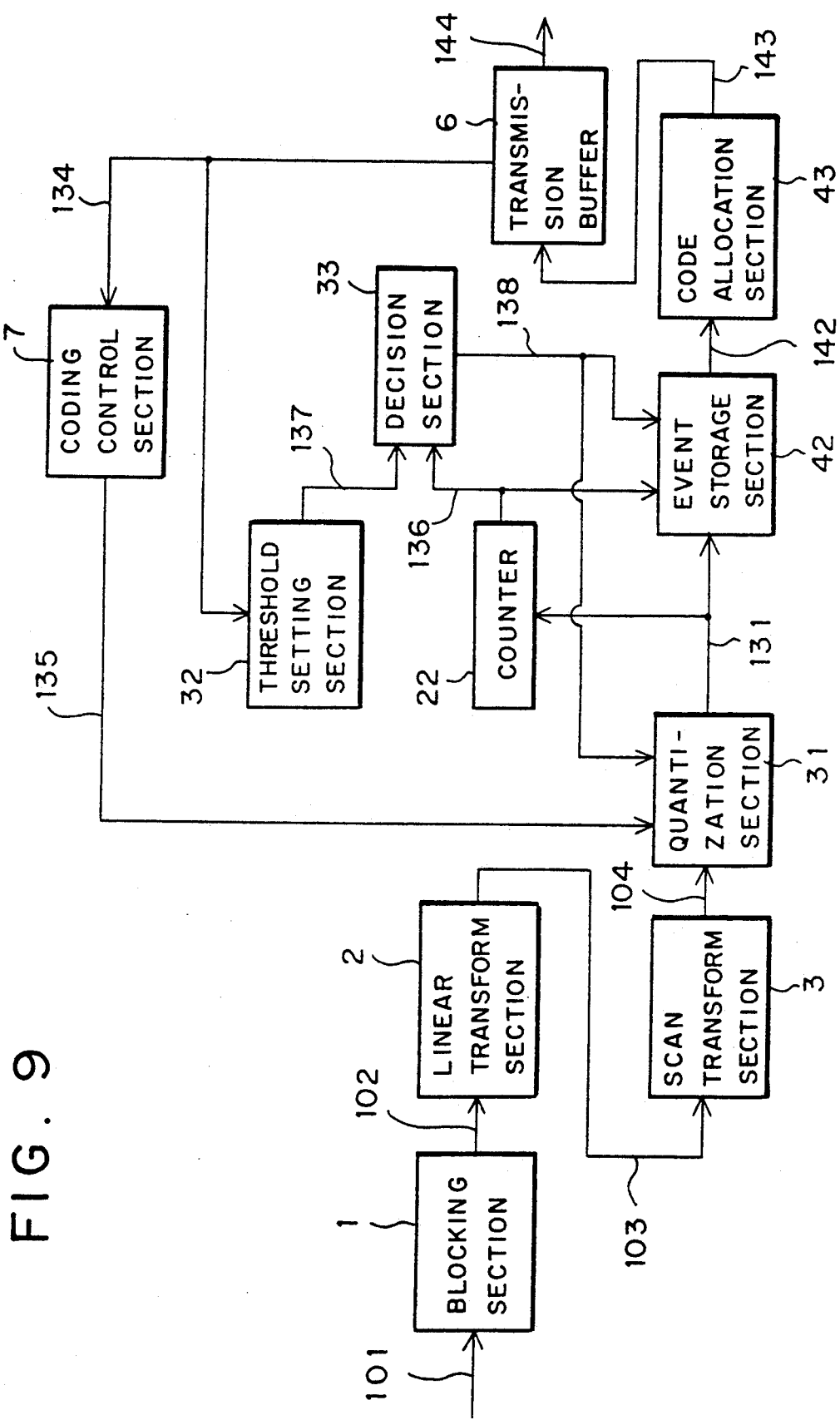
FIG. 9 is a block diagram showing a transform coding apparatus as a third embodiment of the invention.
Figure 10:
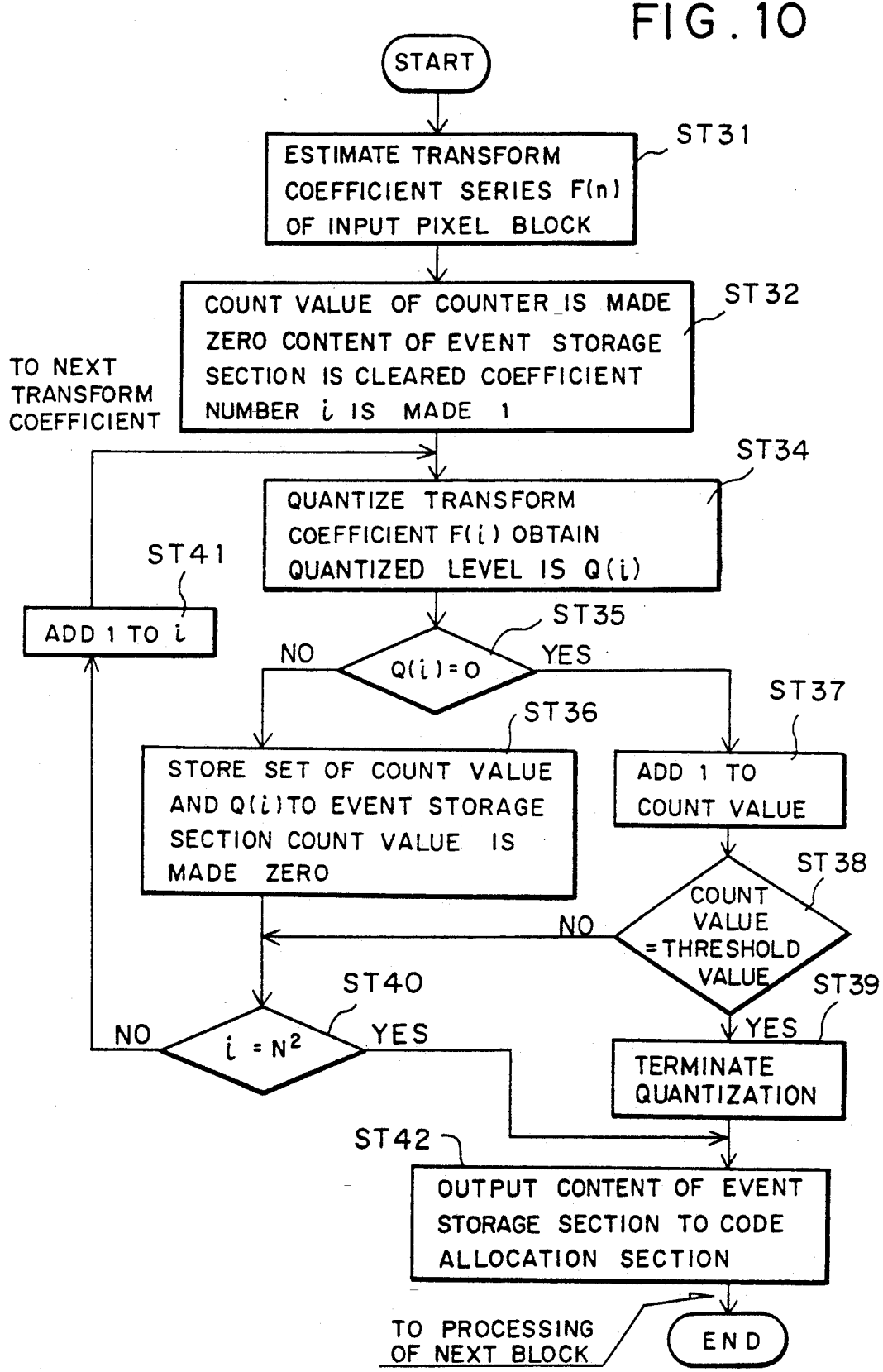
FIG. 10 is a flow chart illustrating operation of the transform coding apparatus shown in FIG. 9.

Next, a third embodiment of the invention will be described based on FIG. 9 and FIG. 10. In FIG. 9, numeral 42 designates an event storage section for temporarily storing an event comprising the value of a non-zero quantized levels among the quantized level 131 and count value 136 at that time, and numeral 43 designates a code allocation section for allocating codes to the event.

Next, operation will be described.

Digitized input image signals 101 are divided for each frame into blocks of N×N pixels, and then subjected to linear transform. The scan transform section 3 rearranges the transform coefficients, and outputs the transform coefficient series F(n) 104 (step ST31). The coding control section 7 determines the quantization step size 135 from the buffer occupancy 134 of the transmission buffer 6, and outputs it to the quantization section 31. The threshold setting section 32 determines the threshold value 137 also from the buffer occupancy 134, and outputs it to the decision section 33. As the initial settings, the count value 136 of the counter 22 is made zero, and the storage content of the event storage section 42 is cleared, and the coefficient number i of the transform coefficient series F(n) 104 constituted by the transform coefficients of $N^2$ is made 1 (step ST32). The quantization section 31 quantizes F(i) being one of the transform coefficient series F(n) 104 in the quantization step size 135, and outputs Q(i) being one of the quantized level series Q(n) 131 (step ST34). If the value of Q(i) is not zero, the event storage section 42 stores the set comprising the count value 136 of the counter 22 and Q(i) being non-zero quantized level as an event. And then the counter 22 is reset and the count value 136 becomes zero (step ST36). If Q(i) is not the last quantized level, quantization of next transform coefficient is performed continuously (steps ST40, ST41). If the value of Q(i) is zero, the counter 22 adds 1 to the count value 136 (step 37). Next the decision section 33 compares the inputted count value 136 with the threshold value 137, and outputs the decision result 138 to the event storage section 42. If the decision result 138 indicates that count value (138)=threshold value (137) (step ST38), or if Q(i) is the last quantized level of the quantized level series Q(n) (step ST40), the event storage section 42 outputs the event 142 stored at present, and the processing of the pixel block terminates (step ST42). The code allocation section 43 allocates Huffman codes and adds EOB to the outputted event 142, and outputs the coded data 143 to the transmission buffer 6. On the contrary, if there is no event 142 to be outputted, since it is an insignificant block, a code representing the insignificant block is outputted as the coded data 143 to the transmission buffer 6.

On the other hand, the quantization in the quantization section 31 is controlled by the decision result 138 from the decision section 33, and if the count value (136)=threshold value (137), the quantization processing is terminated for the subsequent transform coefficients.

In the FIG. 3, for example, when the threshold value is set to 4 or 5, the event stored in the event storage section 42 and the number of the coefficients performing the quantization respectively become as follows.

When the threshold value is 4, since the four zero quantized levels continue from Q(5) to Q(8), the condition of terminating the quantization is satisfied and the event stored as the set of the zero run and the value of the non-zero quantized level is (0, 20), (2, 15), and the number of the transform coefficients performing the quantization becomes eight from Q(1) to Q(8).

When the threshold value is 5, since the five zero coefficients continue from Q(14) to Q(18), the stored event is (0, 20), (2, 15), (4, 5), (3, 2), and the number of the coefficients performing the quantization becomes 18 from Q(1) to Q(18).

As already described, in general, since the magnitude of the transform coefficients becomes smaller from lower frequency components to higher frequency components, the quantized level series Q(n) 131 being a result of the quantization becomes zero consecutively with high probability as n becomes large. Consequently, as the threshold value 137 is made small, the transmission range of the coefficients is limited and the number of the coefficients requiring the quantization becomes small and the amount of the coded bits is also decreased. Consequently, if the threshold value 137 is controlled by feedback adaptively from the buffer occupancy 134 in manner similar to the quantization step size 135, the amount of the coded bits can be smoothed more finely.

According to this embodiment, since all transform coefficients are not necessarily quantized, when only necessary transform coefficients are obtained, the number of the operation to obtain the transform coefficients can be reduced and further advantages can be obtained.

Although combination of the two-dimensional linear transform and the quantization has been described in the above embodiment, similar effects can be obtained also by combination of the one-dimensional or three-dimensional linear transform and the quantization.

Figure 11:
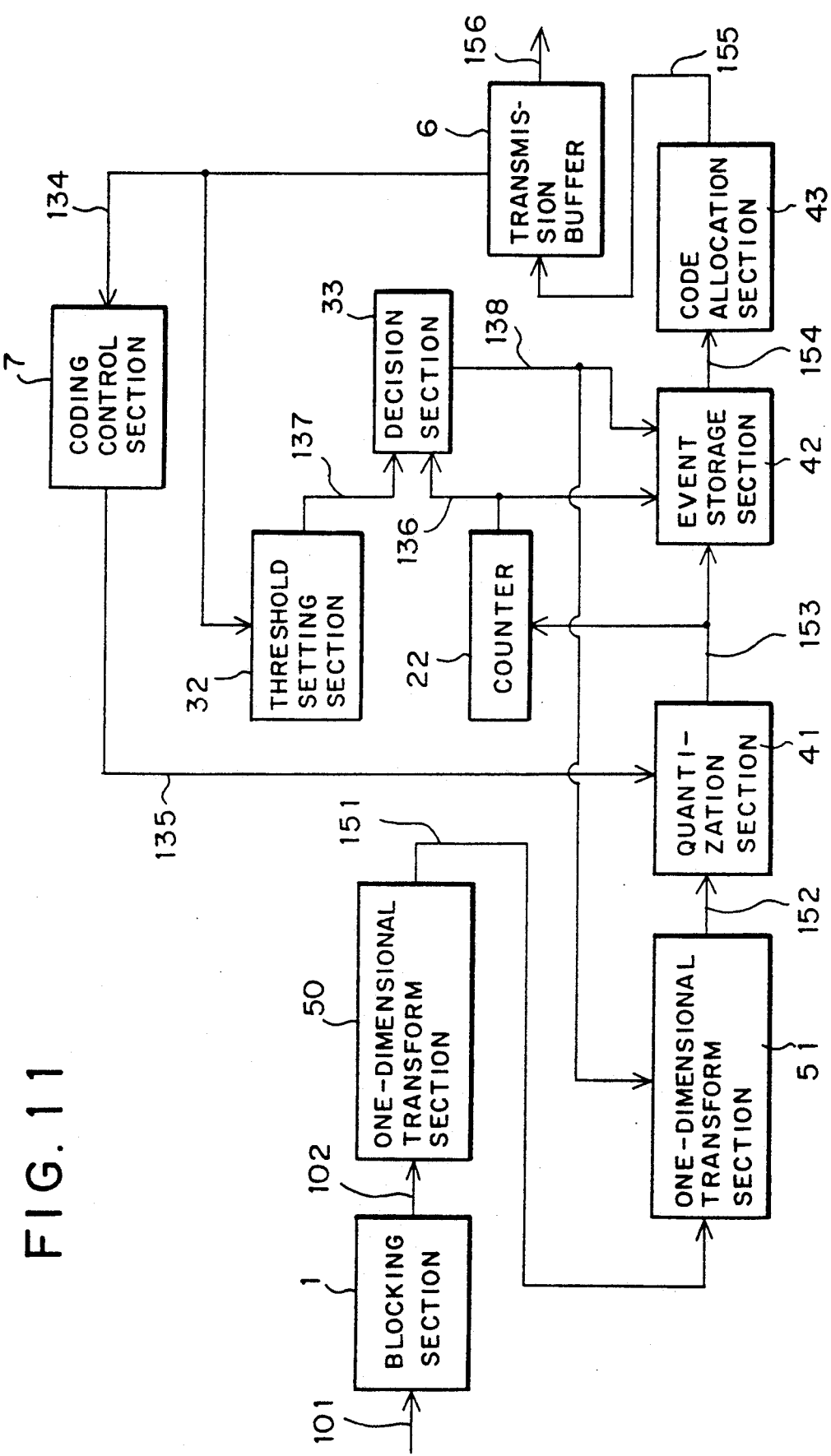
FIG. 11 is a block diagram showing a transform coding apparatus as a fourth embodiment of the invention.

Next, a fourth embodiment of the invention will be described based on FIG. 11 and FIG. 12. In FIG. 11, numeral 50 designates a one-dimensional linear transform section for performing one-dimensional linear transform of the blocked image signals 102, and numeral 51 designates another one-dimensional linear transform section for performing one-dimensional linear transform of outputs of the one-dimensional linear transform section 50 in the other direction.

Next, operation will be described.

Figure 2:
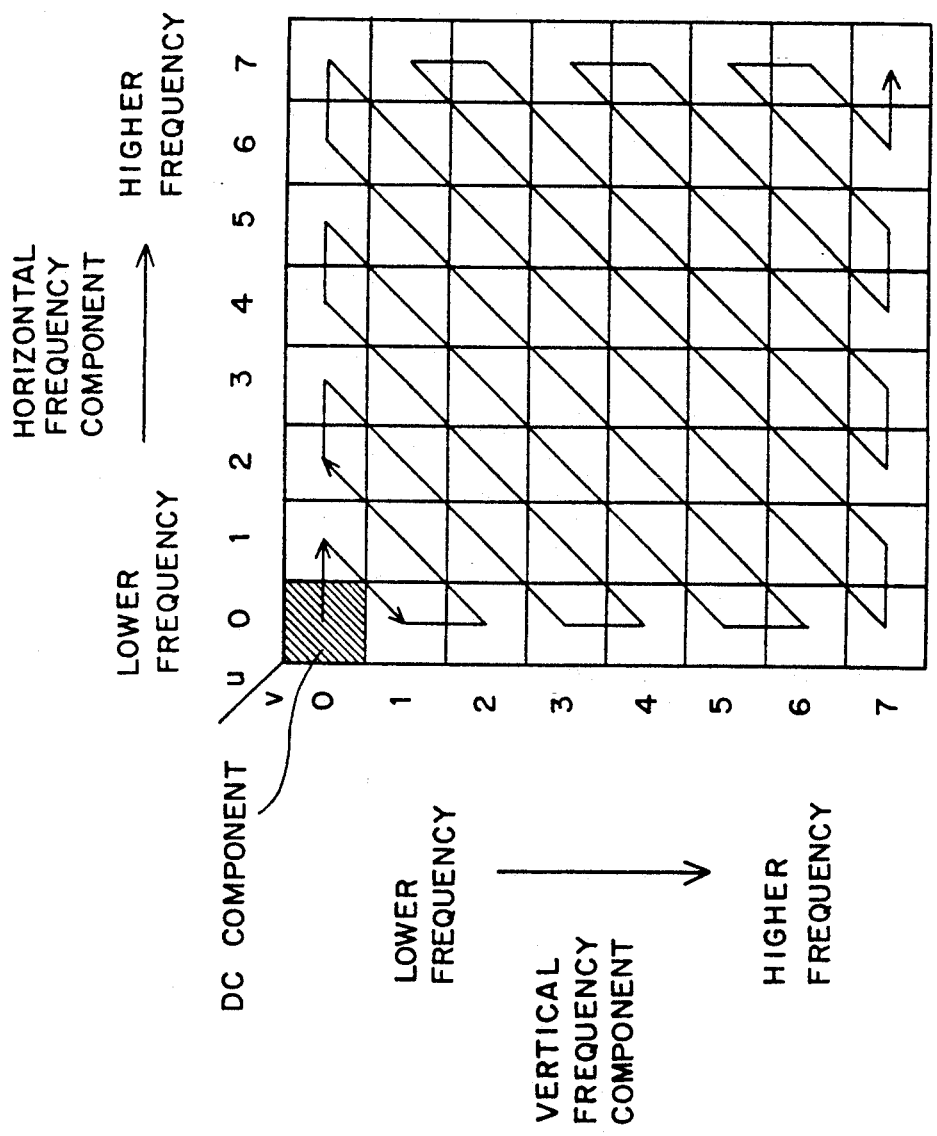
FIG. 2 is an explanation diagram illustrating the properties of a transform coefficient block.

Digitized input image signals 101 are divided for each frame into blocks of N×N pixels by the blocking section 1. The blocked image signals 102 are subjected to, for example, the one-dimensional linear transform operation in the row direction by the one-dimensional linear transform section 50, and become a one-dimensional transform coefficient block 151 having N×N elements (step ST51). As the initial setting, the count value 136 of the counter 22 is made zero, the storage content of the event storage section 42 is cleared, and the coefficient number i of the two-dimensional transform coefficients of $N^2$ pieces scanned in the scan order shown in FIG. 2 is made 1 (step ST52). Next, the one-dimensional linear transform section 51 performs the one-dimensional linear transform operation in the column direction orthogonal to the one-dimensional linear transform block 151, and one of the two-dimensional transform coefficient F(i) of the coefficient number i is outputted (step ST53). The coding control section 7 determines the quantization step size 135 from the buffer occupancy 134 of the transmission buffer 6, and outputs it to the quantization section 41. The threshold setting section 32 determines the threshold value 137 also from the buffer occupancy 134, and outputs it to the decision section 33. The quantization section 41 quantizes the transform coefficient F(i) 152 in the quantization step size 135, and outputs the quantized level Q(i) 153 (step ST54). Next, the decision is performed regarding whether the quantized level Q(i) is zero or not (step ST55). If the value of Q(i) is not zero, the event storage section 42 stores the set comprising the count value 136 of the counter 22 and Q(i) being non-zero quantized level as an event. In this case, the counter 22 makes the count value 22 zero (step ST56). On the other hand, if the quantization coefficient Q(i) is zero in step ST55, the counter 22 adds 1 to the count value 136 (step ST57). The decision section 33 compares the count value 136 with the threshold value 137 (step ST58), and outputs the decision result 138. If the decision result 138 indicates that the count value 136 is equal to or more than the threshold value 137, the one-dimensional linear transform section 51 and the quantization section 41 stop the processing (step ST59). The sets of the number of the zero coefficients among the quantized levels and the value of the non-zero quantized levels stored in the event storage section 42 is outputted to the code allocation section 43 (step ST62). In the comparison of the count value 136 with the threshold value 137 in the decision section 33 as above described, if the count value 136 is less than the threshold value 137 or if the processing in the step ST56 terminates, the event storage section 42 performs decision whether the coefficient number i becomes $N^2$ or not (step ST60). If the coefficient number i is $N^2$, i.e., Q(i) is the last quantized level, the event storage section 42 outputs the event 154 stored at present (step ST62), and the processing of the pixel block ends. The code allocation section 43 allocates Huffman codes and adds EOB to the outputted event 154, and outputs the coded data 155 to the transmission buffer 6. On the contrary, if there is no event 155 to be outputted, since it is an insignificant block, the code representing the insignificant block is outputted as the coded data 155 to the transmission buffer 6. If the coefficient number i is $N^2$ or less and Q(i) is not the last quantized level, 1 is added to the coefficient number i (step ST61), and the operation and quantization of next two-dimensional transform coefficient F(i) are performed continuously.

According to this embodiment, since all two-dimensional transform coefficients are not always necessary, at the one-dimensional linear transform operation the first time, only the one-dimensional transform coefficients necessary to estimate the two-dimensional transform coefficients are estimated, and thereby the number of the operations to obtain transform coefficients can be reduced and further advantageous effects can thereby be obtained.

What is claimed is:

1. A transform coding apparatus wherein a linear transform operation is performed on an input signal series, and transform coefficients are quantized and coded in sequence from the lower frequency components to the higher frequency components in the transform region, said transform coding apparatus comprising:

blocking means for blocking said input signal series;

linear transform means for performing a linear transform operation on the blocked signals and for obtaining a series of transform coefficients in sequence from the lower frequency components to the higher frequency components;

quantizing means for quantizing in sequence each of said transform coefficients in said series of transform coefficients outputted from said linear transform means;

counting means for counting the number of consecutive zero quantized levels in the quantized transform coefficients quantized by said quantization means and for outputting the count values thereof;

threshold determining means for determining the threshold value of the number of consecutive zero quantized levels to be transmitted;

zero quantized level output means for outputting zero quantized levels when activated;

decision means for obtaining at least one additional transform coefficient from said linear transform means when the count value of consecutive zero quantized levels is less than the threshold value and for activating said zero quantized level output means for subsequent transform coefficients when said count value equals said threshold value; and coding means for coding the outputs of said quantization means.

2. A transform coding apparatus as set forth in claim 1, wherein said threshold determining means outputs the threshold value determined previously.

3. A transform coding apparatus as set forth in claim 1, further comprising a transmission buffer for storing codes outputted by said coding means, and control means for determining the size of the quantization step used by said quantization means based on the buffer occupancy of said transmission buffer.

4. A transform coding apparatus as set forth in claim 3, wherein said threshold determining means decreases said threshold value when the buffer occupancy of said transmission buffer is at a low value.

5. A transform coding apparatus wherein a linear transform operation is performed on an input signal series, and transform coefficients are quantized and coded in sequence from the lower frequency components to the higher frequency components in the transform region, said transform coding apparatus comprising:

blocking means for blocking said input signal series;

linear transform means for performing a linear transform operation on the blocked signals;

scan transform means for rearranging the transform coefficients outputted from said linear transform means in sequence from the lower frequency components to the higher frequency components;

quantization means for quantizing in sequence each of said transform coefficients outputted and rearranged by said scan transform means;

counting means for counting the number of consecutive zero quantized levels in the quantized transform coefficients quantized by said quantization means and for outputting the count values thereof;

storage means for storing the number of quantized transform coefficients which are non-zero quantized levels and the number of consecutive zero quantized levels counted by said counting means before the non-zero quantized levels appearing as set in the block unit;

threshold determining means for determining the threshold value of the number of consecutive zero quantized levels to be transmitted;

decision means for quantizing further at least one additional transform coefficient in said quantizing means when the count value of consecutive zero quantized levels counted by said counting means is less than said threshold value and for terminating the quantization processing of subsequent transform coefficients when said count value equals said threshold value; and;

coding means for allocating codes to each set stored in said storage means.

6. A transform coding apparatus as set forth in claim 5, further comprising a transmission buffer for storing codes outputted by said coding means, and control means for determining size of quantization step used by said quantization means based on the buffer occupancy of said transmission buffer, wherein said threshold determining means determines the threshold value based on the buffer occupancy of said transmission buffer.

7. A transform coding apparatus as set forth in claim 6, wherein said threshold determining means decreases said threshold value when the buffer occupancy of said transmission buffer is at a low value.

8. A transform coding apparatus wherein a two-dimensional linear transform operation is performed on an input signal series, and transform coefficients are quantized and coded in sequence from lower frequency components to higher frequency components in the transform region, said transform coding apparatus comprising:

blocking means for blocking said input signal series;

first transform means for applying a one-dimensional linear transform operation to the blocked input signal series so as to obtain a one-dimensional transform coefficient block;

second transform means for applying an orthogonal one-dimensional linear transform operation further to the one-dimensional transform coefficient block so as to obtain a series of two-dimensional coefficients in sequence from the lower frequency components to the higher frequency components;

quantizing means for quantizing each two-dimensional transform coefficient outputted from said second transform means;

counting means for counting the number of consecutive zero quantized levels in the values of the quantized transform coefficients quantized by said quantizing means and for outputting the count values thereof;

storage means for storing the number of non-zero quantized levels and the number of consecutive zero quantized levels counted by said counting means before the non-zero quantized levels appearing as set in the block unit;

decision means for obtaining further two-dimensional transform coefficients from said second transform means when said value of consecutive zero quantized levels is less than said threshold value and for terminating the second transform and quantizing process for subsequent two-dimensional transform coefficients when said count value equals said threshold value; and coding means for allocating codes to each set stored in said storage means.

9. A transform coding apparatus as set forth in claim 8, further comprising a transmission buffer for storing codes outputted by said coding means, and control means for determining size of quantization step used by said quantization means based on the buffer occupancy of said transmission buffer, wherein said threshold determining means determines the threshold value based on the buffer occupancy of said transmission buffer.

10. A transform coding apparatus as set forth in claim 9, wherein said threshold determining means decreases said threshold value when the buffer occupancy of said transmission buffer is at a low value.

* * * * *

UNITED STATES PATENT AND TRADEMARK OFFICE
CERTIFICATE OF CORRECTION

PATENT NO. : 5,086,488

DATED : February 4, 1992

INVENTOR(S) : Yoshiaki Kato et al.

It is certified that error appears in the above-identified patent and that said Letters Patent is hereby corrected as shown below:

Column 8, line 61, "to" should be --so--.

Signed and Sealed this

Twenty-eighth Day of September, 1993

BRUCE LEHMAN

*Attest:*

*Attesting Officer*     *Commissioner of Patents and Trademarks*